(12) United States Patent  
Russell

(10) Patent No.: US 8,041,598 B1  
(45) Date of Patent: Oct. 18, 2011

(54) RAPID PERFORMANCE MANAGEMENT MATRIX METHOD

(75) Inventor: David L. Russell, Woodland Hills, UT (US)

(73) Assignee: Concilient CG, LLC, Provo, UT (US)

( * ) Notice: Subject to any disclaimer, the term of this patent is extended or adjusted under 35 U.S.C. 154(b) by 859 days.

(21) Appl. No.: 12/082,458

(22) Filed: Apr. 11, 2008

Related U.S. Application Data

(60) Provisional application No. 60/926,032, filed on Apr. 23, 2007.

(51) Int. Cl.
*G06Q 10/00* (2006.01)

(52) U.S. Cl. .................. 705/7.42; 705/7.38; 705/7.39

(58) Field of Classification Search ............. 705/7.38, 705/7.39, 7.42
See application file for complete search history.

(56) References Cited

U.S. PATENT DOCUMENTS

| | | | |
|---|---|---|---|
| 6,341,267 B1* | 1/2002 | Taub ................. | 705/7.14 |
| 7,337,120 B2* | 2/2008 | Andrus et al. ........ | 705/1.1 |
| 7,497,688 B1* | 3/2009 | Judd et al. .......... | 434/219 |
| 7,672,861 B2* | 3/2010 | Al-Otaibi et al. .... | 705/7.22 |
| 7,822,634 B2* | 10/2010 | McCall ............. | 705/7.42 |
| 2003/0046125 A1* | 3/2003 | Flores ............... | 705/7 |
| 2003/0101091 A1* | 5/2003 | Levin et al. ......... | 705/11 |
| 2004/0002888 A1* | 1/2004 | Draper et al. ....... | 705/9 |
| 2005/0091102 A1* | 4/2005 | Retsina ............. | 705/10 |
| 2007/0250377 A1* | 10/2007 | Hill et al. ........... | 705/11 |
| 2008/0140688 A1* | 6/2008 | Clayton et al. ...... | 707/100 |

OTHER PUBLICATIONS

Symphony-Metero Products, SymphonyRPM, symphony-metero.com, retrieved from web.archive.org, Mar. 2007, online reprint p. 1-8.*
SymphonyRPM 4.5 Puts Collaborative Decision-Making and Easy-to-Use Performance Management Capabilities in the Hands of Business Users, BusinessWire, Oct. 31, 2005, online reprint p. 1-2.*
SymphonyRPM Announces New Ease-of-Use Features, BeyeNetwork, Nov. 1, 2005, online reprint p. 1-2.*
Raab, SymphonyRPM is Finely Tuned, Jan. 27, 2006, dmnews.com, online reprint p. 1-2.*
SymphonyRPM Unveils New Platform to Deliver Unmatched Performance Management and Predictive Business Analytics Solutions, BusinessWire, May 9, 2005, online reprint p. 1-2.*
SymphonyRPM Adds Features to Enterprise Platform, ebizQ, Nov. 1, 2005, online reprint p. 1-7.*
SymphonyRPM, Continuous Finance, Sales and Operations Planning Solution, 2004, p. 1-36.*

(Continued)

*Primary Examiner* — Justin Pats
(74) *Attorney, Agent, or Firm* — Colter Jennings

(57) ABSTRACT

A method of defining, monitoring, and managing performance, influencing behavior, and aligning behaviors to strategic objectives involves determining with clarity, simplicity and materiality the why, the expectations, the levels of performance, and the projected response, to a set behaviors, accomplishments, and results. For individuals or groups, important behaviors, accomplishments and results are identified, prioritized, and a certain number selected and placed on an RPM matrix and weighted. The RPM matrix lists the weighting as well as specifying levels of performance. After completion of a measurement period, the RPM matrix calculates an RPM score for the individual or group. This RPM score is then used to determine an appropriate reward or response, and can be fed into web-based reporting software.

2 Claims, 5 Drawing Sheets

OTHER PUBLICATIONS

Smith, A New Symphony for Performance Management, IntelligentEnterprise, Feb. 2004, online reprint p. 1-3.*

Leading Medical Device Provider Targets Improved Employee Performance Management With Sapien's Human Capital Management Solution, Press Releases, Sapien LLC, Sapiensoftware.com, Aug. 18, 2006, p. 1.*

Martin et al., Managing Turnover Strategically, Personnel Administrator, vol. 30, No. 11, Nov. 1985, p. 63-73 (online reprint p. 1).*

Lukas, Measuring project controls improvement at Kodak, American Association of Cost Engineers Transactions, 1994, p. QM5.1-QM5.6.*

* cited by examiner

|  | Weight | 1 | 2 | 3 | 4 | 5 | Total RPMs |
|---|---|---|---|---|---|---|---|
| Profit | 7 | 21% | 22% | 23% | 24% | 25% | |
| Revenue Growth | 6 | $650,000-$674,000 | $675,000-$699,999 | $700,000-$724,999 | $725,000-$749,999 | $750,000+ | |
| Client Retention | 3 | 80%-84% | 85%-89% | 90%-93% | 94%-98% | 99%+ | |
| Training | 2 | 85%-87% | 88%-90% | 91%-93% | 94%-95% | 96%+ | |
| Community Education | 2 | 1 event/year | 2 events/year | 3 events/year | 4 events/year | 5 events/year | |
| Total | 20 | | | | | | |

Figure 2

|  | Weight | 1 | 2 | 3 | 4 | 5 | Total RPMs |
|---|---|---|---|---|---|---|---|
| Profit | 7 | 21% | 22% | 23% | 24% | 25% | 28 |
| Revenue Growth | 6 | $650,000-$674,000 | $675,000-$699,999 | $700,000-$724,999 | $725,000-$749,999 | $750,000+ | 18 |
| Client Retention | 3 | 80%-84% | 85%-89% | 90%-93% | 94%-98% | 99%+ | 6 |
| Training | 2 | 85%-87% | 88%-90% | 91%-93% | 94%-95% | 96%+ | 6 |
| Community Education | 2 | 1 event/year | 2 events/year | 3 events/year | 4 events/year | 5 events/year | 4 |
| Total | 20 | | | | | | 62 |

Figure 3

RAPID PERFORMANCE MANAGEMENT MATRIX METHOD

CROSS-REFERENCE TO RELATED APPLICATION

This application claims priority based on U.S. Provisional Patent Application Ser. No. 60/926,032 filed Apr. 23, 2007 and titled "Rapid performance management matrix," the disclosure of which is incorporated herein by this reference.

BACKGROUND

This disclosure relates to a method for preparing a rapid performance management matrix, and in particular a method for promoting behaviors that provide accomplishments that produce results desired by an organization, and analyzing the performance of members of the organization in achieving those behaviors, accomplishments and results.

Corporations and other organizations often struggle to achieve specific results. Management theoretically seeks to direct the efforts of those working for the organization to achieve the desired results. Previously, there have been various methods used to direct those efforts.

Perhaps the most common previous method was no system at all. That is, individual managers used their own methods, ad hoc ideas and processes, or no specific processes, to evaluate employees. Although some organizations have achieved positive results despite a lack of any systematic management approach, such an approach cannot be relied upon in any given fact situation.

Another prior system is based on individual goals of each employee and a manager's subjective sense of the quality of each employee. Typically, the manager categorizes each employee as good, very good, not good, needs improvement, or other such subjective measures. Unfortunately, these systems do not typically have a direct relation to the strategic goals of the organization, and thus whatever efforts are achieved may or may not have any bearing on the results of the organization.

Other prior systems involved numerous convoluted corporate indicators that were too complex and far-removed to influence individual behavior, or systems that did not equitably apply to employee. The employee may be praised, or receive an award for fulfilling objectives, but there is no connection between the award and the performance. The employee may not have cared, the reward may not be worth the effort, or whatever was measured did not translate to enough value for the employee to bother to complete the task. Frequently these systems use after-the-fact measurements, not ongoing movement, as the success criteria. Thus, a method of managing an organization based on promoting behaviors that accomplish desired results throughout an organization while providing an ongoing sense of movement would be very useful.

SUMMARY

This application discloses a management method for companies and other organizations that creates a direct relationship between organization goals and individual efforts and rewards. The process begins by identifying behaviors, accomplishments, and results ("BARs") that the organization determines to be desirable. With respect to each or these BARs, clear, simple, and material determinations and explanations are set forth for why the BAR is important, what the expectation is for each job, what constitutes different levels of performance for each BAR, and what response should be forthcoming in response to varying levels of performance. The identified BARs are prioritized, and preferably between three and seven are selected. As a rule of thumb, selection ends once BARs representing approximately 90-95% of the desired impact have been made.

The selected BARs are then weighted in relation to each other. In one embodiment, the weighting employs a maximum of 20 points; that is, a total of 20 points are allocated to all of the selected BARs. This forces each BAR to have a weighting relative to the other BARS, with those BARs having the most importance being allocated the larger number of points from the total of twenty available.

Next, for each BAR, levels of performance are determined. In one embodiment, five levels of performance are identified. The calibration of levels of performance typically begins by calibrating the highest level first. Even the highest level of performance must be reasonable and achievable, but exceptional. Next, the lowest level of performance is calibrated, perhaps at "expected performance" or "below expected performance" or another appropriate and targeted level. Then, the three intermediate levels of performance are calibrated.

Typically, BARs for the chief executive officer or president of the organization are identified from the organization's strategic imperatives. BARS for each level below the CEO are then identified, using the organization's strategic imperatives as well as the BARs for the CEO as useful data points. Each individual or member in the organization has BARs identified and weightings and performance levels established that relate to the organization's strategic imperatives and that are within their direct control or indirect control with line of sight.

These selections and calibrations for an individual form the foundation of a graph called a rapid performance management ("RPM") matrix. The RPM matrix incorporates the selected BARs for the individual along a vertical axis of the graph and the calibration along the horizontal axis. Each BAR is listed, typically in descending order of importance, along the vertical axis. The adjacent column gives the weighting number for that BAR, and these numbers may be summed in the last row. The top row contains the numbered levels of performance 1-5. Below that, in each cell of the five columns (one each for each calibration level), is a brief statement of the level of performance required for that BAR for that level. The right-most column of the RPM matrix might be titled "Total RPMs" or some other indication.

After the RPM matrices for the individuals of the organization have been prepared, the organization runs for a "measurement period" based on the BARs of the individuals. Typically, the measurement period is as short as is reasonable based on the various actual behaviors, accomplishments and results desired. Often, this will be weekly or monthly or any other useful time period.

Upon the end of a measurement period, the performance or movement of each individual is tracked against that individual's BARs as set forth in the RPM matrix for the individual. An individual's level of performance at the end of the measurement period is indicated in one of the 5 columns or levels of performance. The number of the column in which the performance is indicated is multiplied by the BARs weighting—the total generating the RPMs for the individual for the measured time period.

The calculated RPMs for each BAR are then added to show a total RPM score for that individual; in the case of five levels of performance and 20 point weightings, the RPM score will be between 1 and 100. That RPM score is used to designate a response to the individual's performance. If the RPM score is high, a positive reward may be given to the individual. If low, no reward, or even a demerit of some sort, may be granted.

Appropriate rewards should be identified before any measurement period. With such prior identification, the individual knows and understands the consequences of performance. Furthermore, both the rewards and the BARs should be as objective as possible, preferably including specific numbers whenever feasible. Thus, the RPM matrix may be used to produce an objective measure of performance based on specific, identified criteria, all of which are ultimately based on executing against the organization's strategic imperatives.

BRIEF DESCRIPTION OF THE DRAWINGS

Other features and advantages of the present invention will be apparent from reference to the following Detailed Description taken in conjunction with the accompanying Drawings, in which:

FIG. 2 depicts an exemplary rapid performance management matrix;

FIG. 3 depicts an exemplary calculation of RPM performance using the rapid performance management matrix of FIG. 2;

DETAILED DESCRIPTION

Figure 1:
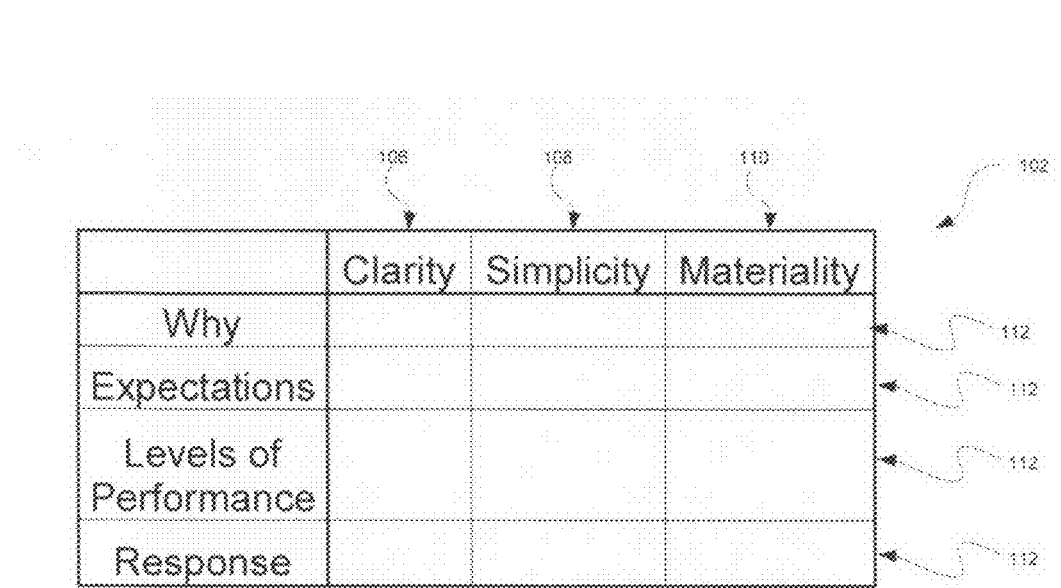
FIG. 1 depicts a grid used in one embodiment to express with clarity, simplicity and materiality, the why, the expectations, the performance, and the response, each of which is to be clear, simple and material.

The present method assists organizations in measuring and providing a sensation of movement along the organization's chosen path to defined results, thereby achieving performance directed by desirable behaviors, accomplishments and results ("BARs") that contribute to the organization's strategic objectives. The BARs assist the organization and those working with the organization in moving forward. The BARs allow the organization's action to align better with the organization's strategy.

In this context, results are attained by achieving a set of specific accomplishments, that is, results are obtained because certain things have been accomplished that tend to bring that result. Accomplishments are achieved by performing a set of behaviors that bring the accomplishment. Accomplishments are obtained because certain behaviors have been performed that bring those accomplishments. Behaviors are actions or movements that end with accomplishments. All behaviors bring accomplishments. The accomplishment may not have been desired, but the behaviors involved brought about that accomplishment.

In general, the shorthand philosophy underpinning this method uses the BAR acronym to refer to any behavior, accomplishment, or result. Typically, the BAR path is entered by a behavior, because typically an accomplishment or result is not obtained if there has been no related behavior. Similarly, a result is typically only attained if the accomplishments that will bring about that result are achieved, and those accomplishments typically are achieved by performing the behaviors that bring those accomplishments. Thus, to gain control over results, which are the core and purpose of a strategy, an organization may want to control, or have maximum influence on, the behavior of each individual that affects the result sought. Furthermore, those behaviors should align with the accomplishments that will bring the results sought. Thus, influencing the behavior of each individual in an organization to aligning the individual's BARs accurately assists in executing on the organization's strategy.

With this in mind, four factors appear key to influencing results: (1) WHY the organization exists, and why each job within the organization exists; (2) the EXPECTATIONS of the organization and each job within the organization; (3) the LEVELS OF PERFORMANCE that indicate for each expectation what is "good" performance and what is "bad" performance; and (4) the RESPONSE to each individual for "good" performance and for "bad" performance. In other words, if the individual knows why the job exists, what is expected (the specific expectations of the job; according to this method, these expectations will be set forth in the individual's BARs), what constitutes "good" and "bad" performance, and what response or reward or punishment will be meted out as a result of the level of performance, the individual may adjust behavior to obtain the desired reward.

For example, consider a baseball team, and an individual (say the pitcher) for that team. The baseball team (the organization) may exist to make money for the owner, by entertaining people when winning games. The WHY: the job or position of pitcher on that team exists as a critical defensive member of that team. The EXPECTATIONS: the team is expected to win as many games as possible. The pitcher is expected to throw a baseball in the direction of a batter at the beginning of each play. The LEVELS OF PERFORMANCE: performing well means the pitcher throws the baseball into the strike zone but in a way that the batter is not able to hit the ball; performing poorly means the pitcher misses the strike zone or the batter gets a hit. The RESPONSE to good performance may be victory, pride, cheers, frame, a bonus or other financial compensation, etc. The response to bad performance may be simply not getting the "good", or may be derision, anger, humiliation, and getting fired or traded.

Preferably, each of these factors is clear, simple and material. Clear means that there are clear definitions for each element. Although perhaps difficult to develop, clear definitions allow the organization to define the path upon which the strategy depends. Without clear definitions of the why, the expectation, the performance level, and the response, individuals may not aligned with that path, and may actually work harder with fewer positive results.

Simple means each element may be quickly and easily communicated to the individual, and that each is "mentally transportable"; that is, average individuals required to do the job in question may carry all the salient information with them in their minds, readily accessible at a point of decision. Typically an individual prefers doing that which is most important, but if the factors are not simple, the individual may not know what is most important at the moment of decision, and the individual may revert to habit or tradition or some other process that is not aligned with, nor controlled by, the organization's strategy.

Material means that the performance matters, preferably matters as much to the individual as to the organization. If the individual knows why they are doing what they are doing, what is expected, what constitutes good behavior, and what they will get for good behavior, the organization will typically get the good behavior, unless the good behavior was impossible for that individual. If the behavior was too difficult or impossible, lack of performance will illuminate that incapability, and the organization may then adjust the level of performance, the response, or give the individual a different task.

FIG. 1 depicts a grid 100 showing the factors 102 on the vertical axis and clarity 106, simplicity 108 and materiality 110 on the horizontal axis. Each box 112 in the grid 100 permits the organization to focus on and to evaluate the ability to influence behavior in general, or with a specific program. By inserting points in each box 112, for instance one of the numbers one through five, the organization may numerically assess the potential effectiveness of a program before implementation, or may assess current programs. If why a job exists, what is expected, what is good performance and what is bad performance, and what each individual gets for doing what is good or bad, is clearly defined, simple, and matters as much to the individual as it does to the organization, the organization will likely influence behavior. The clearer, the simpler, and the more material, the more influence. Of course, defining these four factors may have a great impact on the organization as a group, how it is viewed, and what employees and customers it attracts.

In general, all performance is made up of only two elements, willingness and capability. Those elements have varied names but most simply refer to whether an individual wants to do something at a stated level, and whether the individual can do, or is capable of doing, that thing at a stated level. By inserting an appropriate rating into the boxes 112 of the grid 100, the individual is able to see what is important, and the organization may then directly influence "willingness" and indirectly influence capability. Using the baseball example, the pitcher may have all the desire, direction and coaching in the world, but without skill, it will not be enough. When capability is correctly and precisely illuminated, remedial actions and decisions become easier and more effective.

To address the factors present in the grid depicted in FIG. 1, the present method uses what may be called an RPM matrix 120, a hypothetical sample of which is depicted in FIG. 2. The RPM matrix is used to create and then to measure "business RPMs" for each individual in the organization. These RPMs are derived from the BARs for each individual, or even from any or each given department or section of the organization, or even the entire organization.

Typically, the organization first determines its strategy, and then determines what is needed, and from whom, to fulfill that strategy. Preferably, the process is completed throughout the organization, from the top down, linking everyone together and to the overall strategy, by expectation, level of performance, and by response, but the process may be performed in a limited part of an organization. Also, strategy may grow as matters develop, resulting in modifications to the RPM matrices 120 for various individuals, but it is typically better if the strategy can be stated and known from the beginning.

The process of building an RPM matrix 120 for any given individual or department begins by listing all of the BARs (behaviors, accomplishments, results) needed from the individual (or department) to execute the strategy. Typically the organization lists the desired results, then the accomplishments that will bring those results, and then the behaviors that will bring the listed accomplishments. The list need not be exhaustive, but details are useful.

Preferably, the list of BARs is developed from the top of the organization first, and then down through each structural unit to each individual. Each item on the list should link, directly or indirectly (with "line-of-sight," meaning the individuals are able to see how their behaviors and accomplishments affect the result) to why the organization exits, that is, what overall result is sought. Often, identifying and listing the BARs shows the manager what is needed and illuminates how well the items have, or have not, been communicated to the individual. Listing the BARs also begins to illuminate and reinforce interdependencies between individuals or departments etc.

Next, for each individual or group, the list of BARs is prioritized, from most important (to the reason the organization exists) to least important. Prioritization is preferably done with the sole purpose of achieving the results stated by the strategy of the organization. The most important few, typically no more than seven, are selected and listed in descending order of importance in the first column 122 of the RPM matrix 120 as shown in FIG. 2.

Weighting is important to keep the individual on task. Most organizations have limited time and resources. If an individual does not understand the relative importance of that individual's BARs, the individual may make decisions regardless of any connection with the strategy. The individual may work very hard at the BAR that they do best, and then make sure that everyone is aware of the effort and the quality of work, but because that effort may not be the most important to the organization, the needed results are not achieved.

To avoid this, each BAR for each individual is weighted as to its direct importance to the organization's strategy and as to each of the other BARs for that individual. This allows the organization to distill down to its smallest unit, not only "what" matters most, but specifically "how much" it matters. Numerical weightings are given to each BAR, such as a number from 1 to 10. In one embodiment of the method, the combined weightings for the selected and prioritized BARs totals 20. The numeric weighting for each BAR is given in the second column 124 of the RPM matrix 120, and the weightings are totaled in the bottom cell 126 of that second column.

Next, various "levels of performance" are communicated so that the individual knows what is good performance and what is bad performance for each BAR and, preferably, how those levels of performance relate to the results to which the organization has committed. In one embodiment, there are five levels of performance. These five levels are represented in the RPM matrix 120 as five columns 130, 132, 134, 136, and 138, with the fifth column 138 for the highest level of performance and the first column 130 for the lowest.

Beginning with the fifth column 138, the highest level of performance, which preferably is for "reasonable and doable, but exceptional" performance, a specific statement of that level of performance is inserted into each cell 140 in the fifth column 138 for each of the BARs listed in the RPM matrix 120. Both the individual and the organization should concur that the listed performance is reasonable and do-able, but exceptional. For instance, in golf, a hole in one may be doable and exceptional, but expecting one is not reasonable. Setting this level should be done with consideration for what the best and most qualified individuals could do. If, when calibrated for the entire organization, this level is too low for the strategy to be successful, the organization may want to consider re-evaluating what is reasonable and do-able but exceptional, as well as the BARs and even the strategy.

After setting the highest level of performance in the fifth column 138, the lowest level of performance for each BAR is preferably inserted into the cells 142 of the first column 130. The lowest level may be defined as a minimum level of performance that is acceptable for continued employment or a level slightly above what is considered good but not exceptional performance or some other similar level. The determination may be made by considering the response planned for this level of performance.

Next the levels of performance for the intermediate columns 132, 134 and 136 are set. Again, there are various ways that this can be determined. For instance, these performance levels may be set to make it equally difficult to move from one level to another, or they may be increasingly more difficult or less difficult as performance improves. Again, it may be useful to consider the response that will issue forth for the respective levels of performance.

The result is an RPM matrix with information in each of the cells. A hypothetical example of a completed RPM matrix is depicted in FIG. 2. The BAR column 122 lists five BARs, Profit 148, Revenue Growth 150, Client Retention 152, Training 154, and Community Education 156. The weighting column 124 provides a relative weighting for each of the BARs. Into each cell of the first through fifth columns 130, 132, 134, 136, and 138, are the specific levels of performance, such as 24% profit set forth in the fourth column 136 for the Profit 148 BAR.

The RPM matrix 120 lists what is most needed and expected (the BARs) from an individual (or entity) within an organization, how important each expectation is (weighting), and what are minimal, expected and exceptional levels of performance (columns) in those needed areas (BARs). In essence, what matters most to the organization from an individual is preferably contained within the RPM matrix 120. If calibrated correctly, any level of performance from an individual, in the areas that are most critical to the organization, will land somewhere relative to this spectrum of performance. Very poor performance may be off the scale to the left, but all other performance will likely land somewhere on this matrix.

The use of the RPM matrix 120 involves a measurement period, which is merely a period of time over which performance may be judged. The measurement period may be as short as is reasonable based on the various actual behaviors, accomplishments and results desired. Often, this will be weekly or monthly or any other useful time period.

Upon the end of the measurement period, the individual's performance for the BARs is tracked against that individual's levels of performance as set forth in the individual's RPM matrix 120. As depicted in FIG. 3, the individual's level of performance at the end of the measurement period is indicated in one of the columns 130, 132, 134, 136, or 138. This indication may be done in various ways, but as depicted in FIG. 3, the actual performance level of the individual is outlined in bold.

In the hypothetical example, the individual performed at level four in Profit 148, level three in Revenue Growth 150 and Training 154, and level two in Client Retention 152 and Community Education 156. The number of the column 132, 134, and 136 in which the performance is indicated is multiplied by the BARs weighting from the weighting column 124 and the product set forth in the Total RPMs column 160. Those totals are then added to produce the individual's RPM for that measurement period. In the hypothetical example depicted in FIG. 3, the total RPMs calculated are 62, as set forth in the bottom right cell 164. Note that if the total of the BAR weightings is twenty, and the RPM matrix 120 uses five columns 130, 132, 134, 136, and 138, the RPMs calculated will be on a scale between 1 and 100.

The total RPM score for that individual is used to designate a response to the individual's performance. If the RPM score is high, a positive reward may be given to the individual. If low, no reward, or even a demerit of some sort, may be granted. The RPM matrix 120 for the individual shows what is expected, and it communicates levels of performance with clarity and simplicity to have maximum influence on behavior and thus results.

The RPM scores of the various individuals in an organization are used to allocate responses, or rewards, for high RPM performance. The rewards come from specific "pools of value" set aside by the organization for this purpose. The pools of value may "contain" items of both intrinsic and extrinsic value. Intrinsic value items might include upward mobility, awards, the corner office, first choice for time-off, or even simple recognition for a job well done. Extrinsic value is usually comprised of raises, bonuses, profit-sharing, employee benefits, etc. The particular items that go into the pools of value will depend on the organization, but should be designed to get the maximum performance out of each individual. The preferred goal is for each individual is to not only see but also to "feel" how the RPMs and the possible responses are material to that individual.

For example, in some larger organizations, upward mobility is very important (material) to many individuals. The organization might set a minimum of 85 RPMs to be considered for promotion. The individuals with the highest RPMs might be permitted to select vacation time. Raises or bonuses might be calculated based on RPMs. Using the RPM totals as a guide, the often subjective nature of rewards may be made more objective, and individuals will understand the materiality of high RPM scores.

The RPM matrix 120 and associated reporting may be rendered in a web-based system. Such a system may provide useful reporting structures of RPMs for individuals throughout an organization. Any authorized individual may then review individual performance in an ongoing fashion.

Specifically, the web-based system allows any authorized individual to see any specific RPM matrix or matrices, at any time, anywhere an individual has internet access, with just a couple of clicks of a mouse. When an individual logs on to their website that is specifically created for their RPM Matrix, they may immediately see (if authorized) an Organization Chart representing the entire organization, including each individual. Furthermore, the visibility of the web-based software that accurately calculates each individual's RPMs and makes them available to be seen from the Chairman of the Board on down easily and at anytime, regardless of the individuals ability to politic or get noticed, provides an ongoing and efficient response to performance and an effective "pat-on-the-back".

Figure 4:
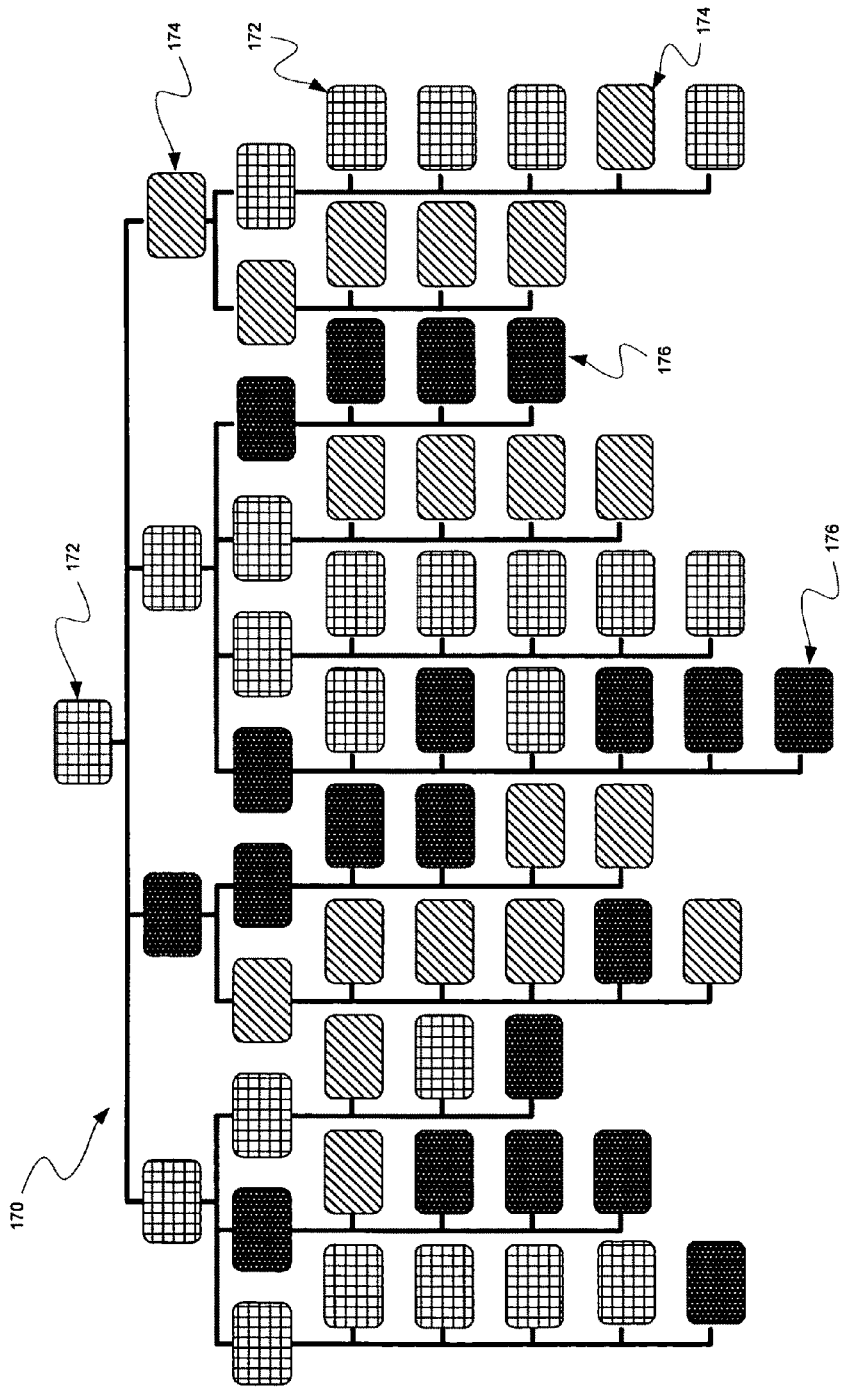
FIG. 4 depicts the RPM performance of various individuals in an exemplary organizational chart.

For example, FIG. 4 depicts an org chart 170 for a hypothetical organization. Each box 172, 174 and 176 represents an individual in the org chart. The org chart may be linked by software to the RPM matrix 120 for each individual. As a result, each box may be coded (such as by color coding, represented by different levels of shading in FIG. 4) to indicate the current RPMs for each individual. For instance, an individual performing at, say, 80 or more RPMs might be represented by a green box, represented in FIG. 4 as a cross-hatched box 172, whereas an individual having RPMs of between 60 and 80 would be represented by a yellow box (represented as a diagonally striped box 174), and an individual with RPMs below 60 would be represented by a red box (represented by a dotted box 176). Different patterns might also be used, as shown in FIG. 4, but using different colors would permit information such as the individual's name legibly to be included in the box 172, 174 or 176.

Figure 5:
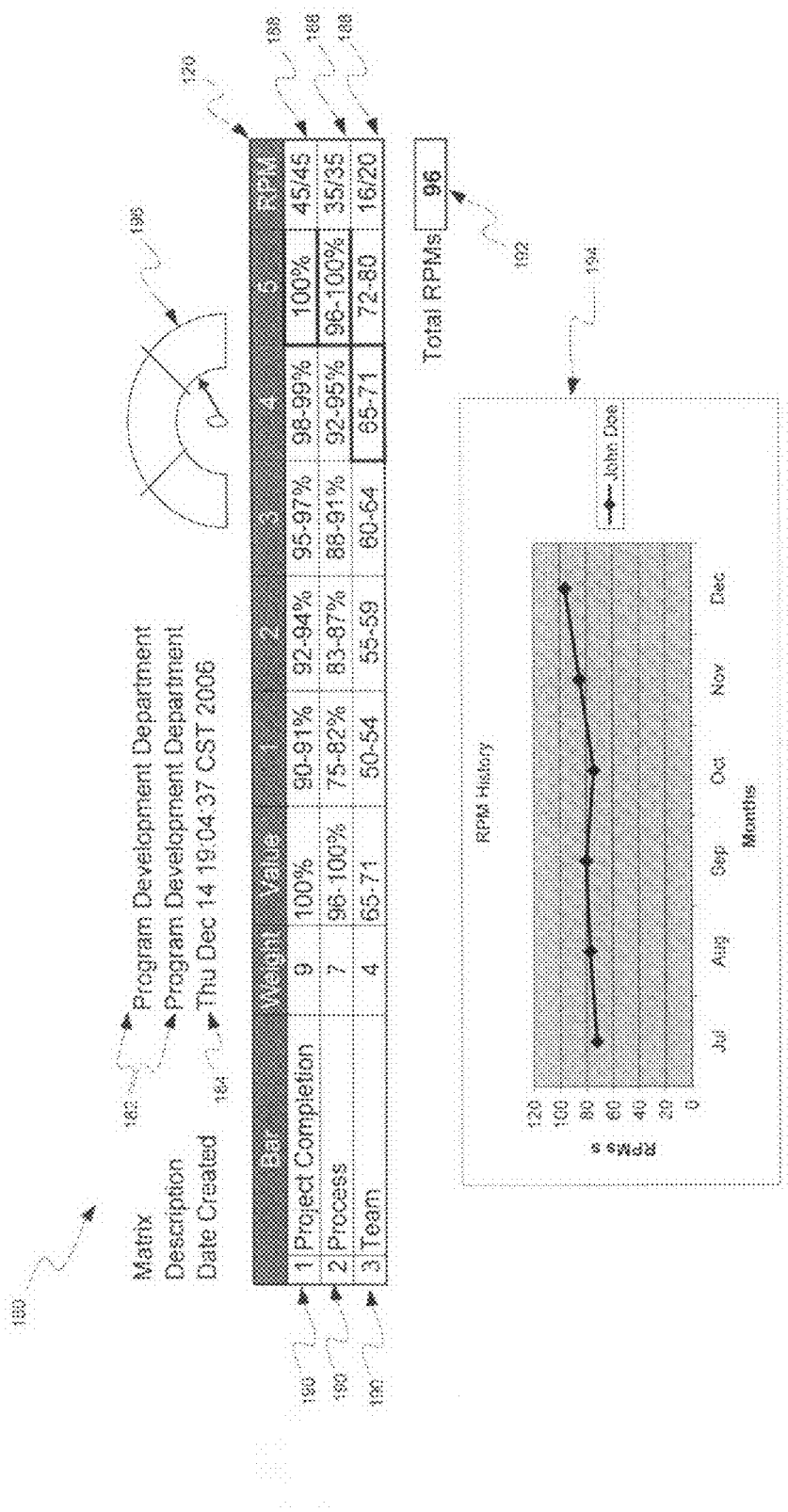
FIG. 5 depicts a report of the RPM matrix for a given individual based on the exemplary rapid performance management matrix of FIG. 2.

The RPM matrix 120 may also be web-based, as depicted schematically in FIG. 5. In this hypothetical representation, the web page 180 depicted may be designed to include significant information about the individual, such as the individual's name and position 182; the time frame for which the RPMs are calculated 184; the RPM matrix 120 in its entirety; the actual RPMs 188 for each BAR 190 as well as for the total RPMs 192 for RPM matrix as a whole; a graphic indicator 194 to show total RPMs over time; an dial indicator 196 of the present RPMs for the individual; an indicator of RPMs applied to the value pool; buttons to link to either the specific or aggregate matrices, and to the RPM history graph 194; qualifiers with "drop-down" menu definitions and a check box for completion; as well as other information as desired. If enabled as a web page, each box or other set of information may be linked to background information for matters shown. In this embodiment, the performance for the measurement period is highlighted and may be clicked so that the actual performance will appear.

Preferably, to maximize ease of use and efficiency, the performance levels may be self-fed, that is, the performance information for each BAR is automatically loaded into the RPM matrix 120 at the end of the measurement period. If any BARs are not measured by other software, then the appropriate individual, usually a manager, may simply click on the level of performance attained for the time period, or type in the actual level of performance. This registers in the software and automatically adjusts all reporting aspects of the software, such as the RPMs for each BAR, the RPM matrix as a whole, the RPM history graph 194, and the actual versus potential payout of the value pool for specified measurement period. In some embodiments, the software may be designed to calibrate the performance levels between level 5 and level 1 on the RPM matrix.

Figure 6:
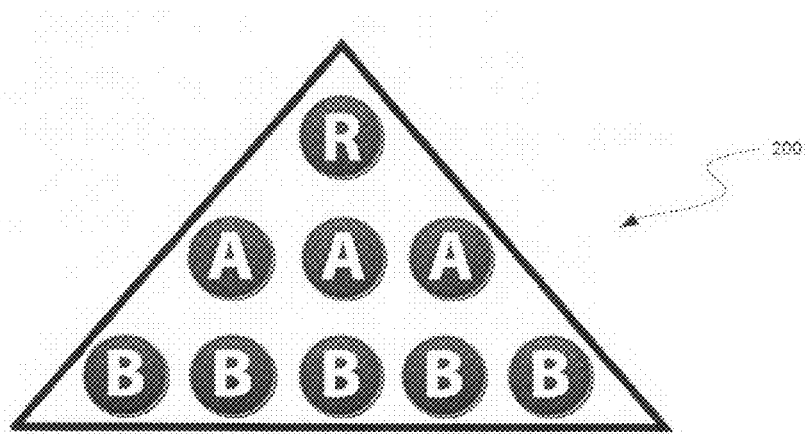
FIG. 6 depicts a BAR pyramid.

As discussed, behind every result sought are a number of accomplishments that link to that result and must occur to achieve that stated result. Behind every accomplishment are a number of behaviors that must happen to achieve the accomplishment. This concept may be represented in a BAR pyramid 200 such as is shown in FIG. 6.

Moving up or down the BAR pyramid 200 in relation to selecting behaviors or accomplishments can have a great impact on achieving results and thus executing on the organization's strategy. As a hypothetical example, a law firm may determine that the receptionist needs to answer the phone better. The reason for this needed improvement is to increase billable hours and thus the profitability of the firm. Defining "better" in this instance may seem very subjective, and the receptionist may not believe the manner of answering the phone has anything to do with billable hour output.

Thus, the firm might arrange the receptionist's RPM matrix to include BARs relating to the number of billable hours, and properly weight that BAR. Because the receptionist's bonus could then be tied directly to completion of the BAR, the receptionist could see how answering the phone (and even upselling services) might increase compensation. Thus, even though the receptionist may have little direct control over billable hours, the receptionist would have a personal interest in increasing them, through the RPM matrix and the response to a high RPM total.

The desire to create "line-of-sight" control, even if indirect, using the RPM matrix shows how moving up the BAR pyramid 200 (from specific behaviors to the accomplishment of billable hours), can allow for measurement and influence to be created where needed, even if initially it doesn't seem possible. It is sometimes necessary to move up the BAR pyramid (that is, up from specific behaviors to specific accomplishments or specific results) to find a measurable aligned BAR. When individuals are given clear and simple accomplishments or results, with direct or in-direct line-of-sight control, with appropriate materiality, they will seek ways of achieving the desired BAR.

Often, the simplest way to move up the BAR pyramid 200 and stay aligned with organization strategy is to just keep asking "why" until a measurable accomplishment or result is found. To move down the BAR pyramid (from results to accomplishments or to behaviors), one keeps asking "how" until the appropriate range of accomplishments and behaviors is revealed. Typically, four to six BARs comprise over 90% of what is needed from a particular entity, and thus going up and down the BAR pyramid may quickly reveal the necessary BARs for any given individual's RPM matrix. Indeed, having more BARs than that may make the RPM matrix too large for the individual to remember.

Creativity can, in many cases, increase an organization's ability to succeed by drawing on all of the individuals' skills and knowledge within the organization, giving the organization a greater pool of capability and energy. This also gives each individual a greater sense of ownership and value in their job, maximizing individual attraction and retention to the organization. Moving up the BAR pyramid 200 increases the need and freedom to create the means to achieving the stated accomplishments and results. With the clarity and simplicity of the RPM matrix 120 and the necessary alignment to the organization's strategy, overbearing managers may feel in control even though the individual has quite a bit of freedom on how something is done, as long as the result is achieved.

On the other hand, there are certain jobs where creativity may not be beneficial. Dealing with hazardous waste, or other highly regulated environments are places where it may be good to limit creativity. This is done by focusing most BARs on behaviors, limiting experimentation that could be dangerous.

In some cases, it may be necessary to isolate individuals from the effect of results without changing the basic core of the system used to measure, define or respond to the individual's performance. By moving down the BAR pyramid 200 and emphasizing (weighting) behaviors more heavily or even completely, RPMs may be generated that reflected the action rather than the result, making the individual less accountable, if at all, for the results. In most cases, the RPM matrix may be used to fine tune the accountability or "sensation" the employee feels, not only by adjusting the selected BARs but also by adjusting the BAR weightings. With this control, it may be possible to isolate an individual from the market, or make an individual fully accountable for market conditions, or anywhere in-between, before the fact, allowing the individual to choose and commit without fear of adjustments out of their control.

BARs are often best influenced and supported when they are responded to as close to the BAR performance as possible. If someone performs well, the sooner they receive a response, either intrinsically or extrinsically, the more likely the performance will be duplicated. Likewise, the sooner a response is received after bad performance, the less likely the performance will continue. With that said, when to measure and when to pay out or formally respond to performance may be an important consideration. It may also be useful to have markers to see and remediate or positively respond to situations within the most effective time frames.

In one embodiment, the period for which data is most reasonably reported (the measurement period) is weekly, or at least monthly. Typical considerations in going beyond weekly is to smooth inherent fluctuations in the chosen BARs on a weekly basis that would make weekly measurements irrelevant, and where creating weekly performance levels is too labor intensive to justify weekly measurement. To create RPMs on an ongoing basis, performance levels might be created for each measurement period. This allows early response and remediation to achieve annual results for the organization. If the response payout period is annual, weekly or monthly RPM performance levels might then form an accurate representation of how fast an individual is generating RPMs. As each week or month goes by, current RPMs as well as the overall RPMs must be accessible, which they are with the web-based software at anytime, anywhere.

Payout periods, or the time when the "pool" of value is accessed and acknowledged, are preferably short, but must take into consideration the cash needed, if any, as well as inherent fluctuations in cash flow. Payouts are preferably designed in a way that levels out expected variances in performance and cash flow so that an individual does not go into "debt" from a previous payout. One advantage of the RPM matrix is that an individual may generate RPMs regularly, which can be a great response in-and-of-itself. As with sand-lot sports, sometimes just the score is enough to generate enthusiasm, effort and even sacrifice, with oftentimes tremendous enjoyment. It can actually give an individual a sense of movement if done in short enough periods.

In one embodiment, there are BARs that have no reasonable spectrum of performance; these BARs might be called enhancers or qualifiers. Often, these are tasks that must be done within a payout or measurement period, but are just "do it or don't do it" BARs. For example, a particular, singular project may need to be completed within a certain timeframe. If it is not done within that timeframe, the consequences are serious. If it is done early, it is inconsequential. So, it either gets done on-time or it doesn't. This then could become a qualifier BAR. It is clearly defined and listed separately from the other BARs, and may be listed below the RPM matrix. If achieved, a qualifier BAR may provide a specific number of RPMs, whereas failure to complete might deduct RPMs or the value pool could be reduced in whole or in part.

Another example of a "qualifier" BAR is reportable accidents. If an area has a reportable accident, either the individual or the entire group might receive a reduction of RPMs. Some qualifier BARs may be serious or important enough that the organization might reduce the pool by 50% or even 100% of an individual's RPMs. Enhancer and qualifier BARs are typically applied carefully, but can be very effective in fine tuning an individual's focus on everything that matters most to strategy execution.

Some organizations find it difficult to set minimum levels of performance and hold each individual accountable for failing to exceed those levels consistently, for a variety of reasons. The RPM matrix 120 allows an organization to set minimum levels of performance that are non-subjective, linked to the stated and committed strategy of the organization, in a way that the individual can commit to and perform against. These levels can be set either for specific BARs or for RPMs as a whole.

For example, a job may have an RPM minimum of 40 RPMs. An individual falling below that minimum might be given a grace period to increase RPMs to 40, failing which the individual would be terminated. Similarly, that same individual who has a minimum of 40 RPMs may also have a minimum RPM for a specifically important BAR. Failure to reach either the BAR or total RPM minimum could result in the same grace period and then termination procedure. This may allow the organization to comply with employment law requirements and may also give the organization the ability to commit to a minimum level of performance knowing it can see and effect each element of that performance, on either the individual level or even the specific BAR level.

Preferably, an RPM matrix 120 is prepared for the entire organization and then individuals' RPM matrix are linked to the organization RPM matrix. For example, the board of directors might create an RPM matrix stating why the organization exists, what is expected, the levels of performance, and what happens with the varying levels of performance.

The CEO is charged with that RPM matrix. An RPM matrix might then be created by answering the question, "what is needed from this individual to achieve 100 RPMs for the organization's RPM Matrix?" This is done for each level of the organization after the level above is completed, that is, the CEO's RPM matrix is completed by the board, then the CEO completes the officer level RPM matrices, the officers completes the VP level RPM matrices, the VP level completes the director level matrices, and so on. This method slices the organization into segments horizontally, and then moves down.

Another method is the vertical method, which slices the organization vertically into functional areas, such as marketing, manufacturing, etc, and then downward. The horizontal method is often better because it allows for dealing with functional interdependencies from the start, but some circumstances benefit from methods that start below the very top and develop vertically downward. Often a pilot section is desired before introducing it to the entire organization, or one section of an organization is ready earlier than others. Vertical methods may be successful when done carefully and with connectors to the interdependent areas of the organization.

One component of an effective organization is its ability to change with its customers and the marketplace in general. The RPM matrix is similarly able to change effectively, and in some cases often and quickly to facilitate a rapid turnaround. Organizations operating on an organic strategy often wish to adjust matrices quickly, smoothly and with credibility. Typically, RPM matrices can be changed anytime, but preferably using the same simple principles by which they were initially established: changes occur before the fact; each BAR links directly to the organization's strategy; each BAR is within direct or in-direct, with line-of-sight, control of the individual; level 5 performance must be reasonable and do-able, but exceptional; and the response to the required effort for each level of performance must be perceived by the individual as equitable.

It is usually better that changes be made as infrequently as possible, and that they are based on sound business decisions that can be seen as such by the general base of individuals, to avoid a loss of credibility by the organization. This ability to change can provide remarkable speed and agility to an otherwise sluggish and cumbersome organization. If a change in strategy is necessary or desired, new RPM matrices can be created before the announcement of the new direction is made. When individuals are informed of the new direction, they can be handed their new RPM matrices.

Office politics are an often discussed and universally disliked aspect of today's business. Office politics are often just misaligned measures of success, that is, individuals' attempts to succeed, find security, value and purpose in ways that do not move the organization along the path defined by the strategy. Politics can often move an organization in the opposite direction of the desired results by actually cannibalizing the value produced by the organization.

If perceived value seeps out to individuals in ways other than through performance, individuals will create ways of obtaining it. Some individuals are very astute at finding or developing alternative means of succeeding, often because of their fear of not being able to perform, and the habit of working the system. The RPM Matrix allows the organization to provide way to represent and respond to performance that is defined by the organization. As value is generated and applied based on the RPMs that are within the control of the individual, then individuals usually will focus on RPMs to receive increased value from their employment, often removing the support, need and fuel for office politics.

The RPM matrix allows for consistency and effective recognition simply by creating an objective and visible means of declaring an individual's performance. In many organizations, individuals who are not in highly visible positions, or are not outgoing by nature, may feel (and may be) overlooked and under appreciated. Making each individual's RPMs available to the Chairman of the Board on down regardless of the individual's political standing may provide a response to performance. The sense of recognition can be effective in influencing behavior to move an organization forward as well as making managing an employee more rewarding and time efficient.

The RPM matrix may also be used during employment interviews. Showing a candidate an RPM matrix may make it easy to explain what is needed from them, and what they can expect in return. The candidate thus can make a more informed choice about the job. The RPM matrix thus may facilitate a determination of the candidate's own willingness and capability to perform in the job.

Building an RPM matrix is typically a collaborative effort requiring a determination of what is reasonable and do-able but exceptional for each BAR of each position. Seeing what each individual believes can reasonably be accomplished, and then combining that with the rest of the organization, can give a good picture of what the organization really believes can be done. When the needs of the market and a company strategy exceed what is commonly accepted as do-able, it can be discouraging, or it can be the fuel for greatness and innovation.

The RPM matrices should have a direct effect on leadership and development. RPM matrices are a tool to allow the organization to declare its chosen direction, what is necessary to get there, and the rewards for doing so. RPM matrices can provide ongoing and unbiased feedback as well as a vision to each individual of what is required to move up in the organization. RPM matrices can facilitate individual development and leadership capability by providing hands-on and measurable experience with real-time and unbiased performance tracking.

The RPM matrices have the ability to create and bond teams. Teams exist as a group of individuals who by consent have one common objective, or objectives, and one common measure, or measures, of success. Bonding is created by the commonality and intensity of experience and sensation. In this regard, RPM matrices provide interesting possibilities.

For example, each member of a team might have a weighted BAR that would reflect the average RPMs of the entire team. The team's success might be defined and dependant upon other team member's success, to the degree appropriate, through weighting. As materiality is engaged, the success of each member of the team becomes critical to all members of the team.

Use of crossing of RPMs can be effective when used with managers of interdependent divisions. Each manager's success may be dependent on the success of other managers. Often this takes a change in thinking, and requires that employees rely on each other, rather than blame each other. This can create some interesting and important discussions, but when applied correctly, should create a team dynamic.

Another way of accomplishing this is to have a common result as a BAR. The example of the receptionist in the law firm is an example of this. Another example of this is having a risk department (one that evaluates the appropriate financing level or acceptance of potential customers) be tied to sales volume, in addition to the quality of risk they allow. They immediately take a different view of sales and their efforts to bring on more business. Finally, using a common "pool" of value for a number of jobs can create a team. For example, the pool used for a sales group could be a percentage of the entire sales volume, not just the sales volume of the individual, and each sales person would receive their percentage of that pool based on their RPMs. As the total sales volume increases, the individuals make more money. If sale volume it decreases, individuals make less, giving them reason and response for supporting other members of the group, and working to increase the effort and effectiveness of each sales team member. This may be of great value when done as an entire company.

The method disclosed allows an organization to set specific, achievable resifts, to be derived from appropriate accomplishments, which are based on specific behaviors, and to lay this out to each individual in the organization. Furthermore, this may be done in an objective way, because the RPMs calculated from the RPM matrix are objective. Thus, the present method has several advantages over the prior art. Although embodiments of the present method been described, various modifications and changes may be made by those skilled in the art without departing from the spirit and scope of the claims.

The invention claimed is:

1. A method, using web-based software in a web-based system, for defining, monitoring, and managing performance of members of an organization, influencing member behavior, and aligning the members' behaviors to the strategic objectives of the organization, comprising the steps of:

selecting a predetermined set of one or more results to be achieved by the organization;

eliciting from the set of results a predetermined set of one or more accomplishments that facilitate achievement of one or more results;

deriving from the set of accomplishments a predetermined set of member behaviors to facilitate achievement of one or more accomplishments;

establishing a data repository to store information that states the sets of behaviors, accomplishments, and results;

correlating specific behaviors, accomplishments, and results to each member in a collaborative process between each member and a predetermined manager;

identifying at least one pool of value to be used as a source for responding to the members' levels of performance;

for each member:

identifying a portion of the pools of value to be used as a source for responding to that member's level of performance;

prioritizing on a list the behaviors, accomplishments, and results correlated to that member based on the probability of producing the predetermined set of results of the organization;

selecting a specified number of behaviors, accomplishments, and results having the highest positions on the prioritized list;

weighting the selected behaviors, accomplishments, and results in relationship to each other by allocating at least one point to each behavior, accomplishment, and result from a pool of a fixed number of points;

populating a matrix having a predetermined number of columns, each assigned a sequential ordinal number, the columns holding data that represent a range of performance relating to that member for each behavior, accomplishment, and result plus a total column, and having a number of rows equal to the number of selected behaviors, accomplishments, and results entered from the top down as prioritized plus a total row;

at a predetermined time, identifying for each row representing a behavior, accomplishment, or result a columnar position representing that member's actual performance;

multiplying, using the web-based software, the number of points allocated to each row by the ordinal number of the column in that row representing that member's actual performance, and entering the resulting numerical value in the total column;

totaling, using the web-based software, the values in the total column for each row and entering the sum in the total row of the total column; and comparing the sum with a potential maximum computed based on achieving the highest column level for each row and, having determined that the comparison exceeds a predetermined criteria, responding to that member's performance by allocating value from that member's portion of the pools and delivering such value to the member;

allowing a predetermined set of managers to monitor the performance of a predetermined set members by providing access over the internet to the matrices associated with the predetermined set of members; and managing each member's performance by evaluating the numerical value in the total column for each row on each member's matrix, identifying the behaviors, accomplishments, and results that may be improved, and applying remedial solutions.

2. The method of claim 1 in which the predetermined set of results is derived from a value associated with a customer.

* * * * *